United States Patent
Archambault et al.

(10) Patent No.: US 11,201,667 B2
(45) Date of Patent: *Dec. 14, 2021

(54) OPTICAL FIBER CHARACTERIZATION MEASUREMENT SYSTEMS AND METHODS

(71) Applicant: Ciena Corporation, Hanover, MD (US)

(72) Inventors: Jean-Luc Archambault, Ottawa (CA); Song Cao, Kanata (CA); Na Young Kim, Ottawa (CA)

(73) Assignee: Ciena Corporation, Hanover, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 17/056,464

(22) PCT Filed: May 15, 2019

(86) PCT No.: PCT/US2019/032353
§ 371 (c)(1),
(2) Date: Nov. 18, 2020

(87) PCT Pub. No.: WO2019/226425
PCT Pub. Date: Nov. 28, 2019

(65) Prior Publication Data
US 2021/0211193 A1 Jul. 8, 2021

Related U.S. Application Data

(63) Continuation of application No. 15/986,396, filed on May 22, 2018, now Pat. No. 10,411,796.

(51) Int. Cl.
*H04B 10/27* (2013.01)
*H04B 10/071* (2013.01)
(Continued)

(52) U.S. Cl.
CPC ......... *H04B 10/071* (2013.01); *G01M 11/319* (2013.01); *G01M 11/3127* (2013.01);
(Continued)

(58) Field of Classification Search
CPC .............. H04B 10/079; H04B 10/071; H04B 10/07951
See application file for complete search history.

(56) References Cited

U.S. PATENT DOCUMENTS

| 6,115,403 A | 9/2000 | Brenner et al. |
| 6,178,038 B1 | 1/2001 | Taylor et al. |
(Continued)

FOREIGN PATENT DOCUMENTS

EP 2701248 A2 2/2014

OTHER PUBLICATIONS

Pilhan Kim, Jaehyoung Park, Hosung Yoon, Jonghan Park, and Namkyoo Park; "In Situ Design Method for Multichannel Gain of a Distributed Raman Amplifier With Multiwave OTDR"; IEEE Photonics Technology Letters, vol. 14, No. 12, Dec. 2002—(C) 2002 IEEE.

(Continued)

*Primary Examiner* — Dzung D Tran
(74) *Attorney, Agent, or Firm* — Clements Bernard Baratta; Lawrence A. Baratta, Jr.; Christopher L. Bernard

(57) ABSTRACT

Systems and methods for characterizing an optical fiber performed in part by an optical node (12) in an optical line system (10) include performing one or more measurements to characterize the optical fiber (16, 18) with one or more components (50, 52) at the optical node (12), wherein the one or more components (50, 52) perform functions during operation of the optical node (12) and are reconfigured to perform the one or measurements independent of the functions; and configuring the optical node (12) for communication over the optical fiber (16, 18) based on the one or more measurements. The one or more components can include any of an Optical Service Channel (OSC), an Optical Time Domain Reflectometer (OTDR), and an optical ampli- (Continued)

fier. The configuring can include setting a launch power into the optical fiber based on the one or more measurements.

20 Claims, 12 Drawing Sheets

(51) Int. Cl.
    *H04Q 11/00*     (2006.01)
    *H04B 10/079*     (2013.01)
    *G01M 11/00*     (2006.01)
    *H04B 10/075*     (2013.01)

(52) U.S. Cl.
    CPC .... *G01M 11/3136* (2013.01); *G01M 11/3154* (2013.01); *G01M 11/3163* (2013.01); *G01M 11/39* (2013.01); *H04B 10/075* (2013.01); *H04B 10/0797* (2013.01); *H04B 10/07951* (2013.01); *H04B 10/07955* (2013.01); *H04B 10/27* (2013.01); *H04Q 11/0062* (2013.01); *H04Q 2011/0083* (2013.01)

(56) References Cited

U.S. PATENT DOCUMENTS

| | | | |
|---|---|---|---|
| 6,236,499 B1 | 5/2001 | Berg et al. | |
| 6,519,082 B2 | 2/2003 | Ghera et al. | |
| 6,525,870 B1 | 2/2003 | Cho et al. | |
| 6,624,927 B1 | 9/2003 | Wong et al. | |
| 6,687,426 B1 | 2/2004 | May et al. | |
| 7,088,436 B2 | 8/2006 | Saunders et al. | |
| 7,336,898 B2 | 2/2008 | Fling et al. | |
| 7,388,657 B2 | 6/2008 | Abott | |
| 8,175,454 B2 * | 5/2012 | Xia | H04B 10/071 398/21 |
| 8,477,411 B2 | 7/2013 | Griseri et al. | |
| 8,564,876 B2 | 10/2013 | Hiraizumi et al. | |
| 8,873,135 B2 | 10/2014 | Sridhar et al. | |
| 8,885,248 B2 | 11/2014 | Bao et al. | |
| 9,148,710 B2 | 9/2015 | Archambault et al. | |
| 9,419,708 B2 | 8/2016 | Rad et al. | |
| 9,847,831 B2 | 12/2017 | Archambault et al. | |
| 10,211,920 B1 * | 2/2019 | Khaleghi | H04B 10/0793 |
| 10,411,796 B1 * | 9/2019 | Archambault | G01M 11/319 |
| 2002/0118442 A1 | 8/2002 | Ghera et al. | |
| 2002/0159134 A1 | 10/2002 | Ghera et al. | |
| 2005/0105167 A1 | 5/2005 | Martinielli et al. | |
| 2009/0297154 A1 * | 12/2009 | Izumi | H04J 14/0221 398/81 |
| 2012/0020672 A1 | 1/2012 | Aguren | |
| 2013/0038865 A1 | 2/2013 | McClean | |
| 2013/0272694 A1 | 10/2013 | Sandstrom | |
| 2015/0198503 A1 * | 7/2015 | Leblanc | G01M 11/31 356/73.1 |
| 2015/0253217 A1 | 9/2015 | Gurusami et al. | |
| 2016/0197673 A1 | 7/2016 | McClean et al. | |
| 2017/0356805 A1 | 12/2017 | Pei et al. | |

OTHER PUBLICATIONS

D. Meshulach, O. Eyal, and R. Klein; "In-Situ time-gated method for fiber characterization and performance prediction of distributed Raman amplification"; (C) 2002—Optical Society of America.

"Optical Networks Having Optical Time Domain Reflectometers Embedded in Small Form Factor Pluggables."

Jul. 8, 2019, Invitation to Pay Additional fees and Annex to Form PCT/ISA/206 Communication Relating to the Results of the Partial International Search for International Application PCT/US2019/032353.

* cited by examiner

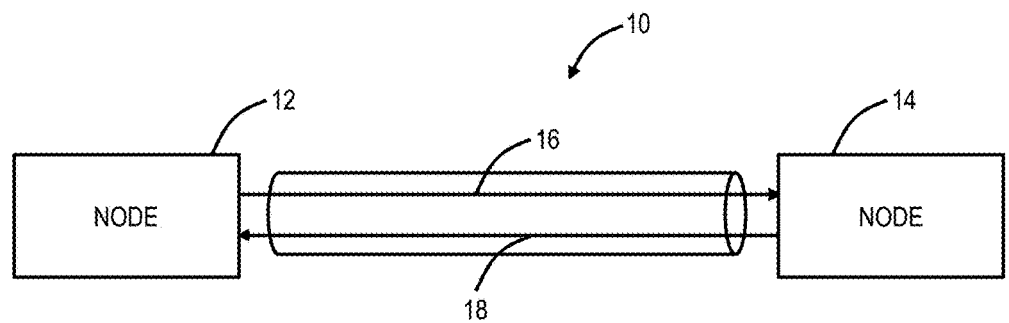
FIG. 1
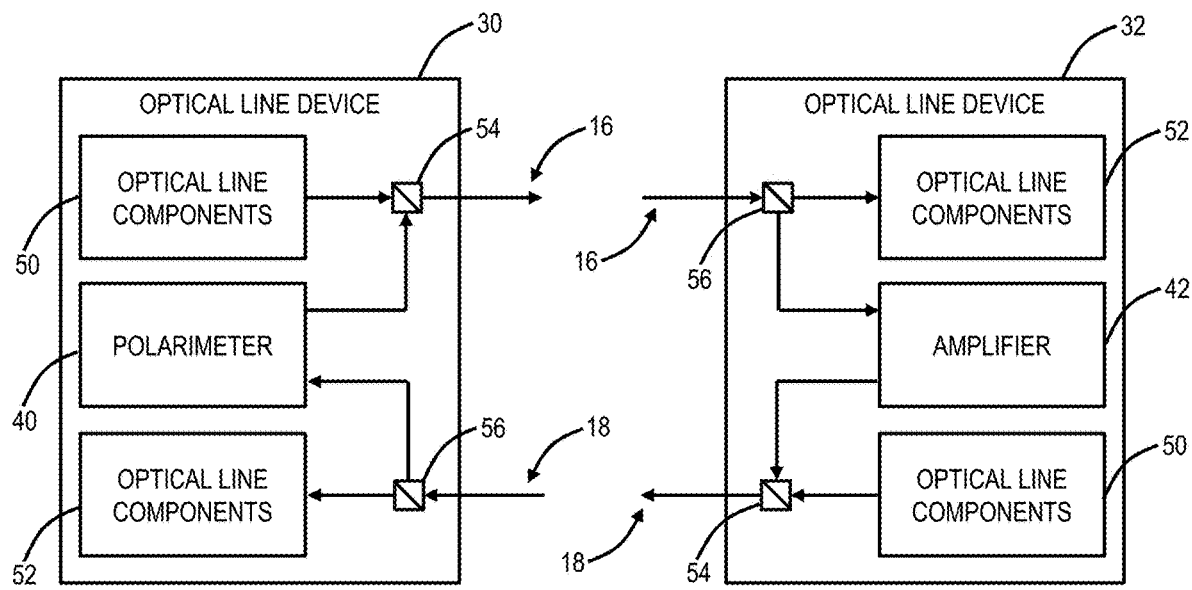
FIG. 2
FIG. 3

OPTICAL FIBER CHARACTERIZATION MEASUREMENT SYSTEMS AND METHODS

FIELD OF THE DISCLOSURE

The present disclosure generally relates to fiber optic communication systems and methods. More particularly, the present disclosure relates to optical fiber characterization measurement systems and methods such as to determine fiber span length, Stimulated Raman Scattering (SRS) measurements, dispersion measurements, etc. for use in optical networking systems.

BACKGROUND OF THE DISCLOSURE

Optical fiber characterization measurements can include, for example, fiber span length, Stimulated Raman Scattering (SRS) measurements, dispersion measurements, loss measurements, etc. The conventional approach to fiber characterization involves out-of-service measurements with test equipment and/or estimates based on calculations (e.g., loss and dispersion determined based on length, fiber type, etc.). The out-of-service measurements are time-consuming, costly, and error-prone (e.g., loading measured data into planning tools, spreadsheets, etc.). Also, the out-of-service measurements may not reflect future conditions when an optical system is in-service. As optical networking systems continue to evolve with higher capacity, there is a need to get as much margin and performance as possible out of the system including having exact fiber characterization measurements for configuring the optical networking system accordingly.

The fiber span length measurement is the physical length of a fiber span. One conventional approach looks to physical route distance such as based on a map, Global Positioning Satellite (GPS), etc. Another conventional approach includes estimating the length of a fiber span in an optical system using an Optical Time Domain Reflectometer (OTDR) trace and identifying the end of the fiber based on observed events or performing a Round-Trip Delay (RTD) measurement using an Optical Service Channel (OSC). The RTD measurement requires sending a data packet from node A to node B, on one fiber, returning that packet to node A on a second fiber, then comparing the timestamps of the outgoing and returning packets. The fiber length can be determined from the timestamps and the speed of light. Using an OTDR trace, it is generally difficult or impossible to unambiguously identify the end of the fiber as it may not be a clear signature in the OTDR trace. For example, in a long span, a low reflection event corresponding to the end of the fiber could be below the noise floor of the OTDR and therefore not detectable. RTD measurements have limited accuracy (+/−5%) because of timing jitter of the OSC packets. Also, RTD measurement assumes that the two fibers have equal length, which may not always be the case.

The fiber SRS measurements relate to fiber nonlinearity. Conventionally, the fiber nonlinearity coefficient or effective area ($A_{eff}$) of the fiber is simply derived from the fiber type information, which is extracted from a database or entered manually in a network design tool. There is no known commercial equipment to perform this type of measurement. Fiber type information is often unreliable as it is usually entered manually. It can also be confusing if mixed fiber types are present in the same fiber span and difficult to combine. Patch panel losses are often ignored or entered in the design tool as a default rather than a measured value. This can result in a large uncertainty in terms of determining the optimal channel launch power in each span based on nonlinear measurements.

The fiber dispersion measurements can be performed in the field using commercial test equipment. However, in many cases, fiber dispersion is derived from the fiber type information, which is extracted from a database or entered manually in a network design tool. The use of commercial test equipment is costly and time-consuming. Further, the commercial test equipment may not be available when needed and it needs to be physically transported to the ends of each fiber span.

BRIEF SUMMARY OF THE DISCLOSURE

In an embodiment, a method for characterizing an optical fiber performed in part by an optical node in an optical line system includes performing one or more measurements to characterize the optical fiber with one or more components at the optical node, wherein the one or more components perform functions during operation of the optical node and are reconfigured to perform the one or measurements independent of the functions; and configuring the optical node for communication over the optical fiber based on the one or more measurements. The one or more components each can include one of an Optical Service Channel (OSC), an Optical Time Domain Reflectometer (OTDR), and an optical amplifier. The configuring can include setting a launch power into the optical fiber based on the one or more measurements.

The one or more components can include an Optical Time Domain Reflectometer (OTDR), and performing one or more measurements can include performing an OTDR measurement with a configurable reflection element configured to provide a clear reference point at an end of the optical fiber; and determining a length of the optical fiber from the OTDR measurement based on the clear reference point. The configurable reflection element can include a 1×N Microelectromechanical systems (MEMS) switch configured to share the OTDR component with a plurality of optical fibers.

The one or more components can include i) an optical amplifier, and ii) at least one device configured to provide an optical wavelength outside of amplification bandwidth of the optical amplifier, and the performing one or more measurements can include measuring power $P_1$ of the optical wavelength at a downstream node from the optical node with the optical amplifier disabled; measuring power $P_2$ of the optical wavelength at the downstream node with the optical amplifier configured to generate Amplified Stimulated Emission (ASE); and determining Stimulated Raman Scattering (SRS) based on the measured power $P_1$ and power $P_2$. The performing one or more measurements further can include scaling the SRS based on fiber length and using an attenuation coefficient of the optical fiber. The optical node can include determining launch power into the optical fiber based on the scaled SRS.

The one or more components can include an Optical Service Channel (OSC) at a first wavelength and an Optical Time Domain Reflectometer (OTDR) at a second wavelength, and wherein performing one or more measurements can include driving each of the first wavelength and the second wavelength with a same bit pattern in a synchronized manner or with known delays; and measuring dispersion over the optical fiber based on receiving the first wavelength and the second wavelength at a downstream node.

The measuring dispersion can include determining a differential time delay between optical pulses on each of the first wavelength and the second wavelength and dividing the differential time delay by a length of the optical fiber and separation of the first wavelength and the second wavelength to determine the dispersion at an average of the first wavelength and the second wavelength.

In another embodiment, an optical node in an optical line system configured to characterize an optical fiber one or more components configured to perform functions during operation of the optical node, wherein the one or more components are configured to perform one or more measurements to characterize the optical fiber, wherein the one or more components perform functions during operation of the optical node and are reconfigured to perform the one or measurements independent of the functions; and an optical modem which is configured for communication over the optical fiber based on the one or more measurements. The one or more components each can include any of an Optical Service Channel (OSC), an Optical Time Domain Reflectometer (OTDR), and an optical amplifier. The launch power into the optical fiber for the optical modem can be set based on the one or more measurements.

The one or more components can include an Optical Time Domain Reflectometer (OTDR), and the one or more measurements can include an OTDR measurement with a configurable reflection element configured to provide a clear reference point at an end of the optical fiber, wherein a length of the optical fiber is determined from the OTDR measurement based on the clear reference point. The configurable reflection element can include a 1×N Microelectromechanical systems (MEMS) switch configured to share the OTDR component with a plurality of optical fibers.

The one or more components can include i) an optical amplifier, and ii) devices configured to provide an optical wavelength outside of amplification bandwidth of the optical amplifier, and the one or more measurements can include a measurement of power $P_1$ of the optical wavelength at a downstream node from the optical node with the optical amplifier disabled; a measurement of power $P_2$ of the optical wavelength at a downstream node from the optical node with the optical amplifier configured to generate Amplified Stimulated Emission (ASE); and a determination of Stimulated Raman Scattering (SRS) based on the measured power $P_1$ and power $P_2$. The SRS can be scaled based on fiber length and using an attenuation coefficient of the optical fiber and used to determine the launch power into the optical fiber.

The one or more components can include an Optical Service Channel (OSC) at a first wavelength and an Optical Time Domain Reflectometer (OTDR) at a second wavelength, and each of the first wavelength and the second wavelength is driven with a same bit pattern in a synchronized manner or with known delays; and dispersion is measured over the optical fiber based on receiving the first wavelength and the second wavelength at a downstream node. The dispersion can be measured by a determining a differential time delay between optical pulses on each of the first wavelength and the second wavelength and dividing the differential time delay by a length of the optical fiber and separation of the first wavelength and the second wavelength to determine the dispersion at an average of the first wavelength and the second wavelength.

In a further embodiment, an apparatus configured to characterize an optical fiber performed in part by an optical node in an optical line system includes circuitry configured to cause one or more measurements to characterize the optical fiber with one or more components at the optical node, wherein the one or more components perform functions during operation of the optical node and are reconfigured to perform the one or measurements independent of the functions; and circuitry configured to configure optical node for communication over the optical fiber based on the one or more measurements.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1 is a network diagram of an optical network with two nodes interconnected by fibers;

FIG. 2 is a block diagram of an optical line device with a polarimeter integrated therein;

FIG. 3 is a block diagram of an optical line device with an amplifier for operation with the optical line device in a looped-back polarimeter configuration;

DETAILED DESCRIPTION OF THE DISCLOSURE

Figure 4:
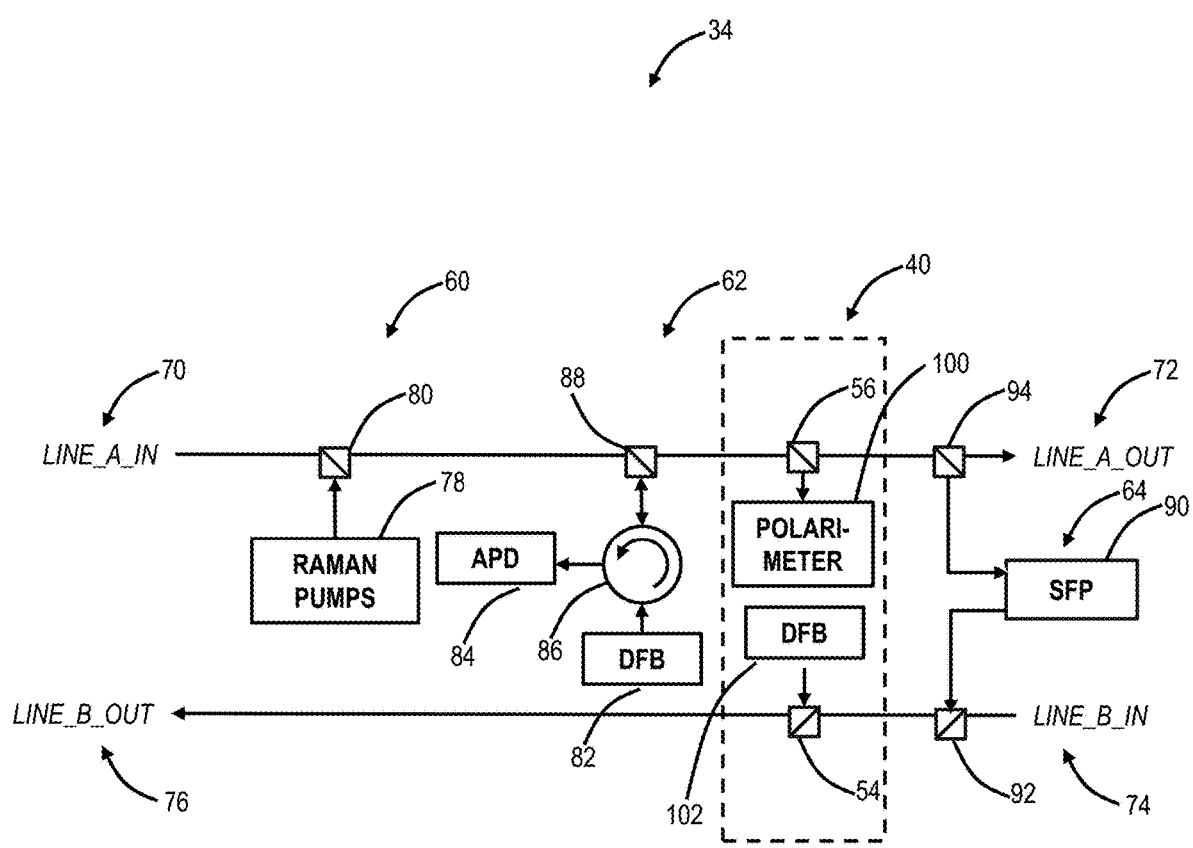
FIG. 4 is a block diagram of an optical line device which is a Raman amplifier with the polarimeter integrated therein.

In various embodiments, the present disclosure relates to optical fiber characterization measurement systems and methods such as to determine fiber span length, Stimulated Raman Scattering (SRS) measurements, dispersion measurements, etc. for use in optical networking systems. The optical fiber characterization measurement systems and methods enable in-service measurements of various optical properties and the associated configuration of an optical line system based thereon, including automatic configuration. With advanced optical systems, it is very desirable to accurately know the fiber span length, nonlinear measurements such as SRS, dispersion measurements, etc. for configuration of various settings including launch power, dispersion compensation filter settings, etc. The conventional approach of estimation sufficed for previous generation systems, but the inaccuracy costs margin which is needed when operating at 100's Gb/s or more and with next-generation optical modems which support flexible modulation and baud rates.

The fiber span length measurement utilizes an OTDR trace with a configurable reflector located at the end of the fiber to provide a reference point for the fiber span length measurement. For example, the configurable reflector can be a 1×N Microelectromechanical systems (MEMS) switch which also is used to configure an OTDR system across N different fibers. The configurable reflector can be enabled and disabled, enabling a comparison between the OTDR traces to accurately locate the end of the fiber.

The fiber SRS measurement can utilize existing equipment in an optical system such as an OSC or OTDR as a probe signal and an amplifier as an ASE source to perform an automated SRS measurement on a per-span basis. An optical transmission system with integrated SRS measurement capability can be used to automatically optimize launch power of optical signals on a per-span basis without a priori knowledge of the fiber type or patch panel losses.

The fiber dispersion measurement utilizes two integrated transmitters at two different wavelengths (e.g., an OSC and OTDR) to perform a differential delay or dispersion measurement of a fiber span. The pulses of the two integrated transmitters can be synchronized at the upstream node, encoded with a bit sequence, and a short time delay measurement technique is performed to measure the delay between the two received signals such as time-based cross-correlation and Fast Fourier Transform (FFT) based phase shift detection. The fiber dispersion measurement can use the fiber span length measurement.

Advantageously, these measurements all can be implemented using integrated equipment in an optical line system such as the OSC, OTDR, etc. The fiber span length measurement supports a length determination between two terminal nodes, such as Reconfigurable Optical Add/Drop Multiplexers (ROADMs). The fiber SRS measurement and the fiber dispersion measurement can support per-span measurements such as between two terminals, two amplifiers, a terminal and an amplifier, etc.

The fiber span length measurement result can be used in the fiber SRS measurement and the fiber dispersion measurement. The fiber SRS measurement and the fiber dispersion measurement can be used to automatically optimize launch power of optical signals on a per-span basis. Advantageously, these measurements can be performed remotely and automatically using the optical line system and various integrated components as described herein. This approach avoids the time, expense, inaccuracy of manual fiber characterization, and reliance on assumptions and defaults.

Optical Line System

FIG. 1 is a network diagram of an optical network 10 with two nodes 12, 14 interconnected by fibers 16, 18. The optical nodes 12, 14 connected to one another over the fibers 16, 18 can be referred to as an optical line system and represents a single span. Of course, those of ordinary skill in the art will recognize the optical network 10 can include additional nodes, fibers, spans, optical amplifier sites, add/drop sites, etc. The nodes 12, 14 can be any type of optical network element including, without limitation, Wavelength Division Multiplexing (WDM) terminals, Reconfigurable Optical Add/Drop Multiplexers (ROADMs), switches, routers, cross-connects, etc. In an embodiment, the nodes 12, 14 have optical transceivers, transponders, or modems (collectively referred to herein as "modems") to provide transmission of traffic-bearing channels. The nodes 12, 14 can further include optical amplifiers such as Erbium Doped Fiber Amplifiers (EDFAs), Raman Amplifiers, or the like. The nodes 12, 14 can include multiplexer and demultiplexer components such as splitters, combiners, Wavelength Selective Switches, etc. to perform WDM of multiple traffic-bearing channels from multiple modems. Also, the nodes 12, 14 can include various other components such as Optical Service Channels (OSCs) for management communication between optical nodes such as optical amplifiers, Optical Time Domain Reflectometers (OTDR) to measure back reflections over the fibers 16, 18, Raman amplifiers, and the like.

The various aforementioned components in the nodes 12, 14 can be physically realized in hardware components in a network element forming the node 12, 14. The hardware components can be included in line cards, line modules, pluggable modules, "pizza boxes" which are small-form-factor units such as 1-2 Rack Units (RU) high, or the like. The hardware components are generally optically connected to one another for ultimate transmission and reception over the fibers 16, 18. As described herein, an optical line device is a hardware device which is part of the nodes 12, 14 and integrated therein. Examples of optical line devices can include Raman amplifier modules, EDFA amplifier modules, OSC modules, OTDR modules, modems, and the like.

The modems can include Non-Return-to-Zero (NRZ), duobinary, quadrature amplitude modulation (QAM), differential phase shift keying (DPSK), differential quadrature phase shift keying (DQPSK), orthogonal frequency-division multiplexing (OFDM), polarization multiplexing with any of the foregoing, and any other type of optical modulation and detection technique. Importantly, the modems utilize advanced coherent modulation/demodulation techniques, thus the modems have to be properly configured having full visibility of the optical properties of the fibers 16, 18. Also, the nodes 12, 14 can communicate to a management system such as a Network Management System (NMS), an Element Management System (EMS), a Path Computation Element (PCE), a Software Defined Networking (SDN) controller, a control plane, or the like.

Integrated Polarimeter in an Optical Line Device/System

Figure 5:
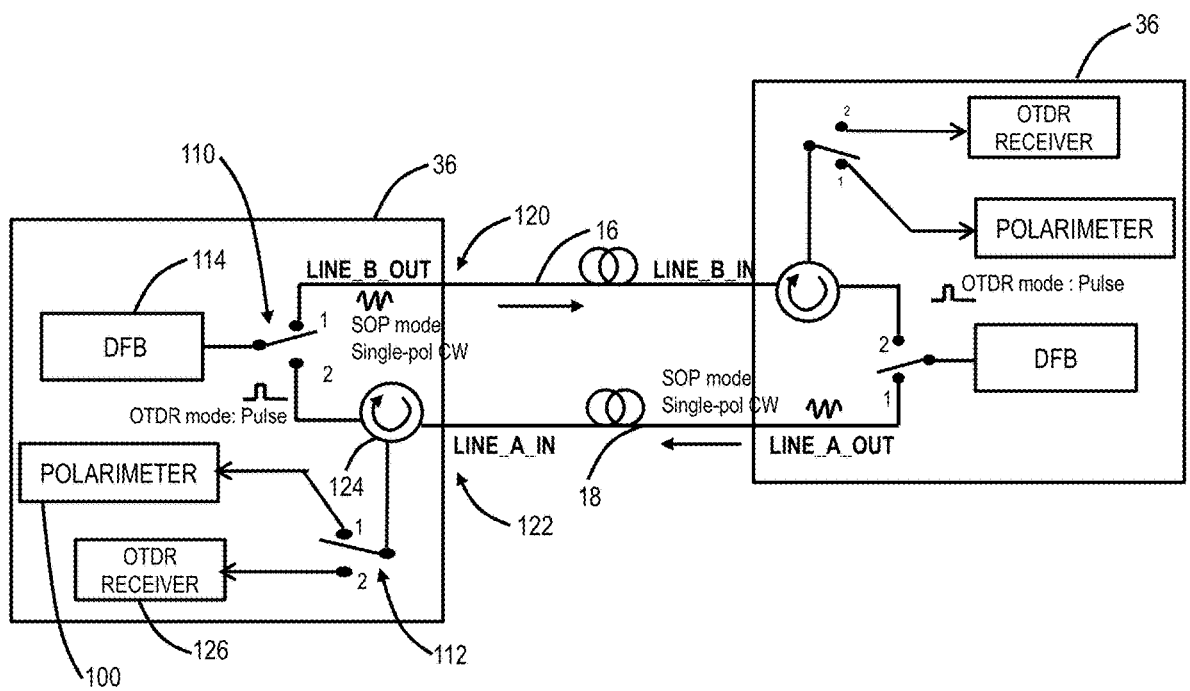
FIG. 5 is a block diagram of an optical line device which can be a pluggable module or the like with the polarimeter integrated therein sharing components with an Optical Time Domain Reflectometer (OTDR)

FIG. 2 is a block diagram of an optical line device 30 with a polarimeter 40 integrated therein, FIG. 3 is a block diagram of an optical line device 32 with an amplifier 42 for operation with the optical line device 30 in a looped-back polarimeter configuration, FIG. 4 is a block diagram of an optical line device 34 which is a Raman amplifier with the polarimeter 40 integrated therein, and FIG. 5 is a block diagram of an optical line device 36 which can be a pluggable module or the like with the polarimeter 40 integrated therein sharing components with an OTDR.

In FIG. 2, the optical line device 30 includes the polarimeter 40 integrated therein, supporting the transmission of a polarimeter probe signal on the fiber 16 and reception of a corresponding polarimeter probe signal on the fiber 18. In an embodiment, the optical line device 30 can be used at various nodes in the optical network 10 to support polarimeter probe signals on both the fibers 16, 18. In FIG. 3, the optical line device 32 includes the amplifier 42 integrated therein which is configured to receive the polarimeter probe signal on the fiber 16, to amplify the polarimeter probe signal, and to loop back the polarimeter probe signal on the fiber 18. Thus, in one embodiment, the optical line device 30 can be at opposing nodes 12, 14 to support a single polarimeter probe signal on each fiber 16, 18, and in another embodiment, the optical line device 30 can be at the node 12 and the optical line device 32 can be at the node 14 to support a loopback of the same probe signal. The loopback can provide additional details for finer granularity of localization of SOP transients. In another embodiment, the optical line device 30 can be at opposing nodes 12, 14 to support a single polarimeter probe signal which each propagates on the fiber 16, 18, in opposite directions. Variously, the transmitter for the single polarimeter probe signal can be tunable. Where the single polarimeter probe signals from opposing optical line devices 30 counter-propagate, the tunable transmitter can tune to different wavelengths for each of the polarization probe signals. In this manner, a virtual loopback is achieved as polarimeter data is obtained from both the opposing optical line devices 30 and this polarimeter data can be used for fault localization in a similar manner as the physical loopback with the optical line device 32.

The optical line devices 30, 32 include various optical line components 50, 52 in addition to the polarimeter 40 and the amplifier 42. The optical line components 50 are shown transmitting on the fiber 16 whereas the optical line component 52 is shown receiving from the fiber 18. The optical line components 50, 52 can be integrated within the optical line system such as EDFA amplifiers, Raman amplifiers, OSCs, OTDRs, modems or transceivers, WSSs, or the like. The optical line devices 30, 32 include filters 54, 56 for multiplexing and demultiplexing the polarimeter probe signal with WDM signals, OSC signals, OTDR signals, Raman pumps, and the like. In the optical line components 50, the filter 54 configured to combine an output of the polarimeter 40 with an output of the optical line components 50 and the filter 56 is configured to split the polarimeter probe signal to the polarimeter 40 and the other signals (WDM signals, OSC signals, OTDR signals, Raman pumps, etc.) to the optical line components 52. Similarly, in the optical line device 32, the filter 56 splits the polarimeter probe signal to the amplifier 42 separate from the other signals which are provided to the optical line components 52 and the filter 54 combines an output of the amplifier 42, i.e., the amplified polarization probe signal, with outputs of the optical line components 50. The optical line device 32 is illustrated herein with the amplifier 42, but in other embodiments, the amplifier 42 may be omitted in lieu of a simple connection forming the loopback function in the optical line device 32. This may be used in cases where amplification is not required for the polarization probe signal to traverse both of the fibers 16, 18, such as in shorter spans.

With respect to integration, the optical line devices 30, 32 can be line cards, Raman amplifier modules, EDFA amplifier modules, OSC modules, OTDR modules, modems, pluggable modules, pizza boxes, and the like. Also, the integrated polarimeter can be realized in a pluggable module that is configured to plug into another hardware device in the optical line system. These hardware devices are part of the optical line system and operate in an integrated manner. That is, these hardware devices support unified management and control, i.e., Operations, Administration, Maintenance, and Provisioning (OAM&P). The polarimeter 40 is able to operate through this unified management and control as well as in-service with WDM traffic-bearing channels, OSC channels, OTDR signals, and the like. The amplifier 42 can be an EDFA, a Semiconductor Optical Amplifier (SOA), Raman amplifier, or the like. Note, depending on the wavelength of the polarimeter probe signal, the amplifier 42 may require different operating bands from conventional EDFAs. Based on the connectivity of the amplifier 42, the optical line device 32 is configured to loop back an amplified polarimeter probe signal, back to the optical line device 30.

The polarimeter 40 includes a transmitter coupled to the filter 54 and a receiver coupled to the filter 56. Note, generally the polarimeter 40 is a receiving device configured to measure the polarization of a test signal. Those of ordinary skill in the art will recognize the integrated polarimeter described herein includes the receiving device and the transmitter for the test signal, i.e., the polarization probe signal. In an embodiment, the receiver can include the embodiment in FIG. 6. In an embodiment, the transmitter can be a Distributed Feedback Laser (DFB), such as to provide a single polarization, Continuous Wave (CW) or pulse. The transmitter provides the polarization probe signal at a wavelength which does not interfere with the WDM traffic-bearing channels, OSC channels, OTDR signals, and the like. For example, the WDM traffic-bearing channels may be in the C-band, such as about 1528-1560 nm; of course, other transmission bands are also contemplated. Raman pumps are typically below 1500 nm in the 1400 nm range. The OSC channels, the OTDR wavelengths, and the like can be selected not to interfere with one another and the polarization probe signal. For example, the OSC channels can be 1510 nm, 1625 nm, or the like. In an embodiment, the polarization probe signal is at 1591 nm to avoid nonlinear interaction with Raman pumps. Of course, other values are also contemplated for the polarimeter 40 and the polarimeter probe signal, so long as the value does not interfere with other signals in the optical line system. In an embodiment, the polarimeter 40 can share a laser with an OTDR as described herein.

FIG. 4 illustrates the optical line device 34 which is a Raman amplifier with the polarimeter 40 integrated therein along with Raman amplifies 60, an OTDR 62, and an OSC 64. The optical line device 34 is a four-port optical device with a line_A_in port 70, a line_A_out port 72, a line_B_out port 74, and a line_B_in port 76. For example, line A could be coupled to the fiber 16 or other optical components and line B could be coupled to the fiber 18 or other optical components. The Raman amplifier 60 includes one or more Raman pumps 78 which are coupled via a filter 80 to counter-propagate out the line_A_in port 70. The filter can be a 14XX filter where XX is the wavelength in the 1400-1500 nm range for the Raman pumps, or the filter can combine any signal below 1500 nm or the like with other signals above 1500 nm. The OTDR 62 can provide back reflection measurements via a DFB laser 82 and a detector 84, such as an avalanche photodiode. The DFB laser 82 and the detector 84 can be coupled to the line_A_in port 70 via a circulator 86 or the like and a filter 88. In an embodiment, the DFB laser 82 can be 1527 nm; of course, other wavelengths are also contemplated. The OSC 64 can be realized through a pluggable optical transceiver 90 such as a Small Form Factor Pluggable (SFP) or the like. The OSC 64 is both added via a filter 92 and removed via a filter 94 to provide a bi-directional telemetry channel. In an embodiment, the OSC 64 can operate at 1511 nm; of course, other wavelengths are also contemplated.

The polarimeter 40 includes a receiver 100 and a DFB laser 102. Again, the DFB laser 102 provides the test signal, i.e., the polarization probe signal to the line_B_out port 76 via the filter 54 and receives at the receiver 100 a corresponding test signal from the line_A_in port 70 via the filter 56. Again, in an embodiment, the DFB laser 102 can be at 1591 nm; of course, other wavelengths are also contemplated. In this embodiment, the test signal co-propagates with the C-Band for WDM traffic-bearing channels, thereby enabling detection of SOP transients from an upstream polarization probe signal. The receiver 100 contemplates any architecture including the various embodiment described in FIG. 6. Thus, in the optical line device 34, the Raman amplifier 60, the OTDR 62, the OSC 64, and the polarimeter 40 can operate concurrently as each has a different operating wavelength and each of the operating wavelengths are outside the C-band for WDM traffic-bearing channels.

In FIG. 5, the optical line device 36 is a pluggable module which can be plugged into the optical line system to support dual OTDR and polarimeter functionality. FIG. 5 illustrates two complementary optical line devices 36 connected to one another such as via the fibers 16, 18. The optical line device 36 is configured to operate either as an OTDR or a polarimeter, based on the configuration of switches 110, 112. Note, both the OTDR and the polarimeter can share a DFB laser 114 which can be configured as a pulse for an OTDR mode or a single polarization Continuous Wave (CW) for an SOP mode. The optical line device 36 includes an output port 120 and an input port 122. The DFB laser 114 is coupled to the switch 110 which couples the DFB laser 114 to the output port 120 for the SOP mode and to the input port 122 via a circulator 124 for the OTDR mode to measure back reflections. The input port 122 is coupled to the circulator 124 which connects to either a polarimeter receiver 100 or an OTDR receiver 126 based on the configuration of the switch 112. In an embodiment, the default operation of the optical line device 36 can be a polarimeter, i.e., the switches 110, 112 connected to the "1" position, with the OTDR mode selectively enabled as needed to measure back reflections.

Figure 6:
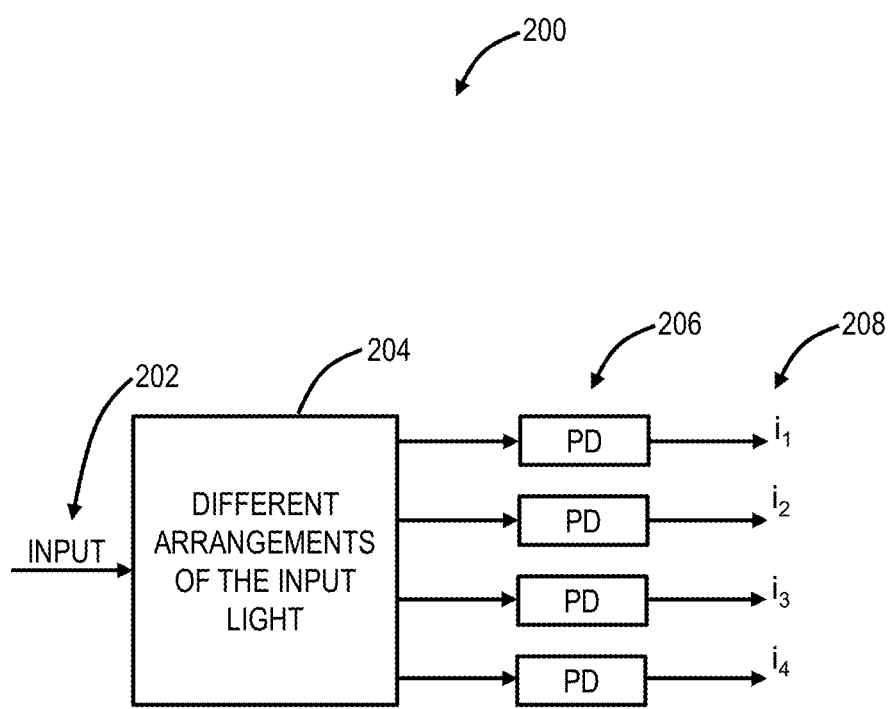
FIG. 6 is a block diagram illustrates a Division of Amplitude Polarimeter (DOAP) which may be used for the integrated polarimeter'

FIG. 6 is a block diagram illustrates a Division of Amplitude Polarimeter (DOAP) 200 which may be used for the integrated polarimeter. The DOAP 200 has input light 202 which is variously arranged through different arrangements 204 which output the differently arranged light to four detectors 206 which provide corresponding electrical outputs $i_1$, $i_2$, $i_3$, $i_4$ 208 which are linear projections of the Stokes Parameters of the input light 202. The different arrangements 204 divides the input light 202 into different ways (commonly 4 ways) with different arrangements so that the output photocurrents of the DOAP 200 are the linear projections of the input light 202 SOP. The important technology of the polarimeter is the element realizing the different arrangements 204 of light.

Bidirectional OTDR

Figure 7:
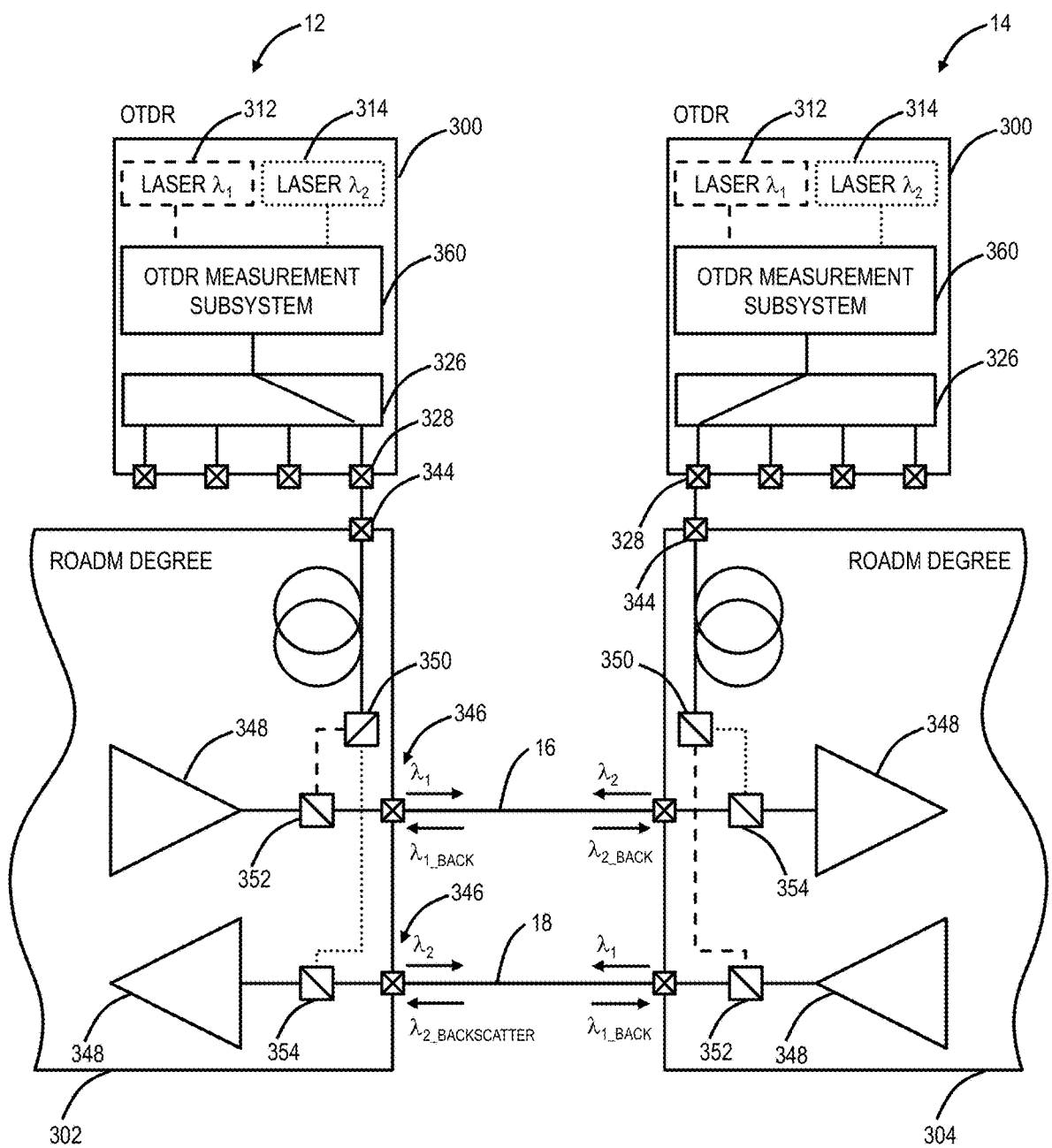
FIG. 7 is a block diagram of a bi-directional OTDR configuration.

FIG. 7 is a block diagram of a bi-directional OTDR configuration. Here, OTDR measurement systems 300 are connected to ROADM degrees 302, 304 for a pair of fibers 16, 18. Here, the OTDR measurement system 300's port 328 is connected to a port 344 of the ROADM degree 302 and similarly, the OTDR measurement system 300's port 328 is connected to the port 344 of the ROADM degree 304. The ROADM degrees 302, 304 are connected to one another via the fibers 16, 18. With a 1×4 optical switch 326, the OTDR measurement systems 300 can connect to three additional ROADM degrees (not shown). One advantage of the OTDR measurement systems 300 is there is only a single fiber connection between the port 344 and the port 328.

The ROADM degree 302, 304 can be formed by a module which includes ports 346 connectable to the fibers 16, 18 and the port 344. The module can include other functionality such as optical amplifiers 348 (e.g., EDFAs, Raman pumps, etc.), Wavelength Selective Switches (WSS), and the like. The module forming the ROADM degree 302, 304 includes various filters 350, 352, 354 to distribute the wavelengths $\lambda_1$, $\lambda_2$ from the OTDR measurement systems 300. Within the ROADM degree 302, 304, the OTDR signal connection between the port 344 is coupled to an optical filter 350, which demultiplexes the two wavelengths $\lambda_1$, $\lambda_2$. A second filter 352 combines the wavelength $\lambda_1$ (e.g., red wavelength) with the WDM signals from the amplifier 348 going in the transmit direction, i.e., right to left on the fiber 16 and left to right on the fiber 18.

A third filter 354 similarly combines the wavelength $\lambda_2$ (e.g., blue wavelength) with the WDM signals coming into the ROADM degree 302, 304 in the receive direction (right to left on the fiber 18 and left to right on the fiber 16); in this case, the OTDR source and the WDM signals signal are counter-propagating. Both ends of the fibers 16, 18 have a similar arrangement, which means that within each fiber 16, 18, there is a red OTDR source (wavelength $\lambda_1$) co-propagating with the WDM signals and a blue OTDR source (wavelength $\lambda_2$) counter-propagating.

In this example, OTDR wavelength $\lambda_1$ is transmitted co-propagating with the WDM channels on the fiber 16 and a backscatter signal $\lambda_{1\_BACK}$ is received back at an OTDR measurement subsystem 360 in the OTDR measurement system 300. In the other direction on the fiber 16, the OTDR wavelength $\lambda_2$ is transmitted counter-propagating with the WDM channels and a backscatter signal $\lambda_{2\_BACK}$ is received back at the OTDR measurement subsystem 360. The fiber 18 has the opposite configuration as the fiber 16 with respect to the wavelengths $\lambda_1$, $\lambda_2$, $\lambda_{1\_BACK}$, $\lambda_{2\_BACK}$.

The use of two distinct wavelengths $\lambda_1$, $\lambda_2$ ensures that the two OTDR sources sharing the same fiber 16, 18 do not interfere with each other and, therefore, can operate independently. This eliminates the need to synchronize the ODTR's at both ends of the span, which greatly simplifies the software implementation. It ensures that both OTDR's are available at any time since one OTDR being in use does not prevent the other from taking measurements. There is also the benefit of simplified cabling since only a single fiber is required to connect the OTDR measurement system 300 to a ROADM card or module for both directions.

Figure 8:
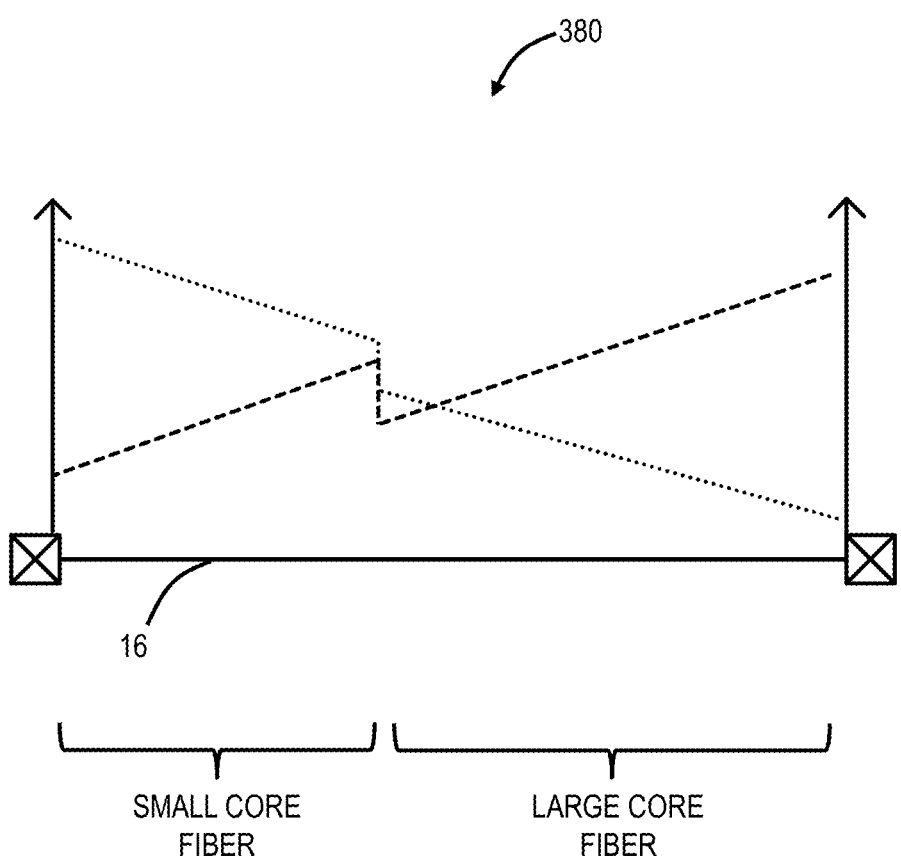
FIG. 8 is a graph of an OTDR trace on a fiber illustrating differentiation of different fiber types.

FIG. 8 is a graph of an OTDR trace 380 on a fiber 16 illustrating differentiation of different fiber types. Once dual-wavelength OTDR traces are acquired at each OTDR measurement system 300, the trace data can be exchanged between the network elements via an Optical Service Channel (OSC), a Data Communications Network (DCN), or the like so that composite traces can be created by combining the traces collected from both ends of the same fiber 16. The traces from each span could also be collated by a higher-level application such as an EMS, NMS, SDN application, etc. In the case of a bi-directional OTDR, similar splice loss will be observed in both directions, whereas a change in fiber type in a span will appear as a loss in one direction (going from smaller core to larger core fiber) but as gain in the other (going from larger to smaller core).

The choice of the two wavelengths $\lambda_1$, $\lambda_2$ is an important part of the design. In an embodiment, wavelength $\lambda_1$ is a red wavelength, e.g., greater than 1560 nm, outside of the Erbium Doped Fiber Amplifier (EDFA) amplification band and greater than WDM signals which are typically between 1530 nm and 1565 nm (i.e., the EDFA amplification band). The wavelength $\lambda_2$ can be a blue wavelength, e.g., less than 1530 nm, similarly outside of the EDFA amplification band and less than WDM signals. In an embodiment, wavelength $\lambda_1$ co-propagates with the WDM signals while wavelength $\lambda_2$ counter-propagates with the WDM signals. The aforementioned selection of wavelengths $\lambda_1$, $\lambda_2$ advantageously supports in-service operation with WDM signals. That is, an important aspect of the OTDR measurement system 300 is that it utilizes two OTDR sources at two different wavelengths (e.g., red and blue wavelengths) in order to interrogate two fibers connected to a node in the transmit and receive directions. In an embodiment, wavelength $\lambda_1$ is 1625 nm, and wavelength $\lambda_2$ is 1527 nm.

Again, the two wavelengths are selected to be outside of one or more signal bands with traffic-bearing channels (e.g., C-Band, approximately 1530 to 1565 nm, or other transmission bands such as the L-band, S-band, etc.), so that the bi-directional OTDR can operate in-service while traffic is running. That is, the two wavelengths are selected to be outside of spectrum reserved for traffic-bearing channels. For example, by selecting the wavelength $\lambda_1$ co-propagating with the WDM signals greater than a largest valued wavelength in the one or more signal bands (e.g., 1560 nm in the C-band), i.e., a longer wavelength, non-linear interactions such as cross-phase modulation are avoided or minimized relative to the WDM signals. For the counter-propagation, there is more flexibility as non-linear interactions with the WDM signals are minimized. By selecting the wavelength $\lambda_2$ counter-propagating with the WDM signals less than a smallest valued wavelength in the one or more signal bands (e.g., 1528 nm in the C-band), i.e., a shorter wavelength, the wavelength $\lambda_2$ can be used to measure and profile Raman gain. For example, an OTDR wavelength immediately below the WDM signal band can be used to monitor Raman gain. Having one wavelength in the Raman gain regime and one outside would help to perform in-service measurements of the Raman gain and its distribution through the fiber medium, without needing to rely solely on baseline traces taken without the Raman pumps on. Of course, other values for the different wavelengths $\lambda_1$, $\lambda$ are also contemplated. Also, the lasers can include tunable wavelengths, supporting different wavelengths for different applications.

Fiber Span Length Measurement

Figure 9:
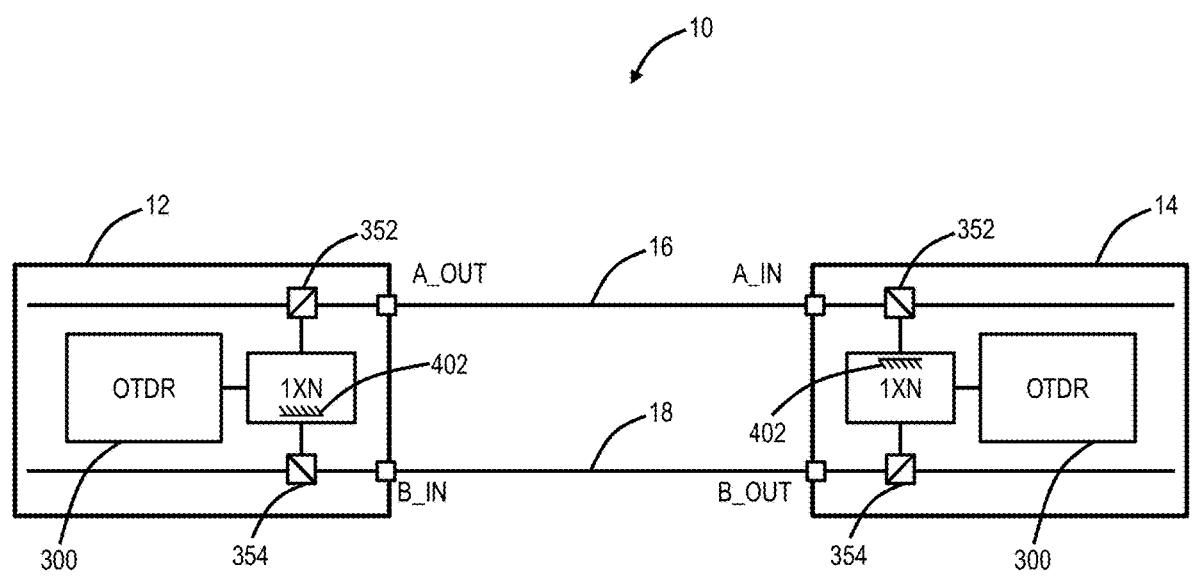
FIG. 9 is a network diagram of the optical network for illustrating a fiber span length measurement.

FIG. 9 is a network diagram of the optical network 10 for illustrating a fiber span length measurement. As described herein, using an OTDR trace to determine fiber span length, it is generally difficult or impossible to unambiguously identify the end of the fiber 16, 18 as it may not be a clear signature in the OTDR trace. In an embodiment, a configurable reflection element 402 is used at each end of the fiber 16, 18 to provide a clear reference point that can be used to identify the location of the fiber end in the OTDR trace. Each fiber 16, 18 can be measured separately and the accuracy of the length measurement can be better than +/−1%.

The nodes 12, 14 can include an integrated OTDR such as the OTDR measurement system 300. The fiber span length measurement can utilize the OTDR measurement system 300 to determine the fiber span length based on an OTDR trace. Of note, the OTDR measurement system 300 includes a 1×N Microelectromechanical systems (MEMS) switch (e.g., the 1×4 optical switch 326) with is the configurable reflection element 402. The fiber span length measurement can be implemented with any additional components in the OTDR measurement system 300 by calibrating the configurable reflection element 402 to be configured as a mirror for at least one of the line ports.

As described herein, the OTDR measurement system 300 can operate in-service so the fiber span length measurement can be performed in-service. Further, the fiber span length measurement measures the length of the fiber which may be different from the physical distance since there may be fiber slack, non-direct physical routing, etc.

The 1×N MEMS switch is the configurable reflection element 402 which can be a high reflection element at end of a span opposite the OTDR source to provide a clear reference point that can be used to identify the location of the fiber end in the OTDR trace. Of note, this is the location of the end of a fiber and the OTDR source is the location of the start of the fiber. In some OTDR configurations, the 1×4 optical switch 326 is used to share the same OTDR hardware across multiple fibers. For example, a line amplifier site might use the 1×4 optical switch 326 to be able to perform OTDR measurements across all 4 fibers entering and exiting that site. In an embodiment, the 1×N switch includes a MEMS mirror which can be tilted at different angles to couple different fibers to each other. The MEMS mirror can also be tilted to reflect light from a given input fiber onto itself, thus creating a controllable mirror. This is illustrated in FIG. 9, for a fiber span with fibers 16, 18.

To measure the length of the fiber 16, the 1×N MEMS switch (the configurable reflection element 402) is configured at the node 14 to reflect the OTDR wavelength coming from Line_A_In, the OTDR trace is captured at the node 12, and a high reflection point is determined at the end of the fiber 16 based on the 1×N MEMS switch.

To measure the length of the fiber 18, the 1×N MEMS switch (the configurable reflection element 402) is configured at the node 12 to reflect the OTDR wavelength coming from Line_B_In, the OTDR trace is captured at the node 14, and a high reflection point is determined at the end of the fiber 18 based on the 1×N MEMS switch.

Note, the configurable reflection element 402 could be implemented in other manners, for example, using a passive reflection element (fiber with a metallized end face, thin film filter, etc.). Having the ability to turn the reflection on and off using a switch or Variable Optical Attenuator (VOA) is desirable as it makes it easier for software to distinguish the far end reflection from other reflections that might occur in the line system, simply by comparing OTDR traces with and without the far end reflection set by the configurable reflection element 402.

Fiber SRS Measurement

Figure 10:
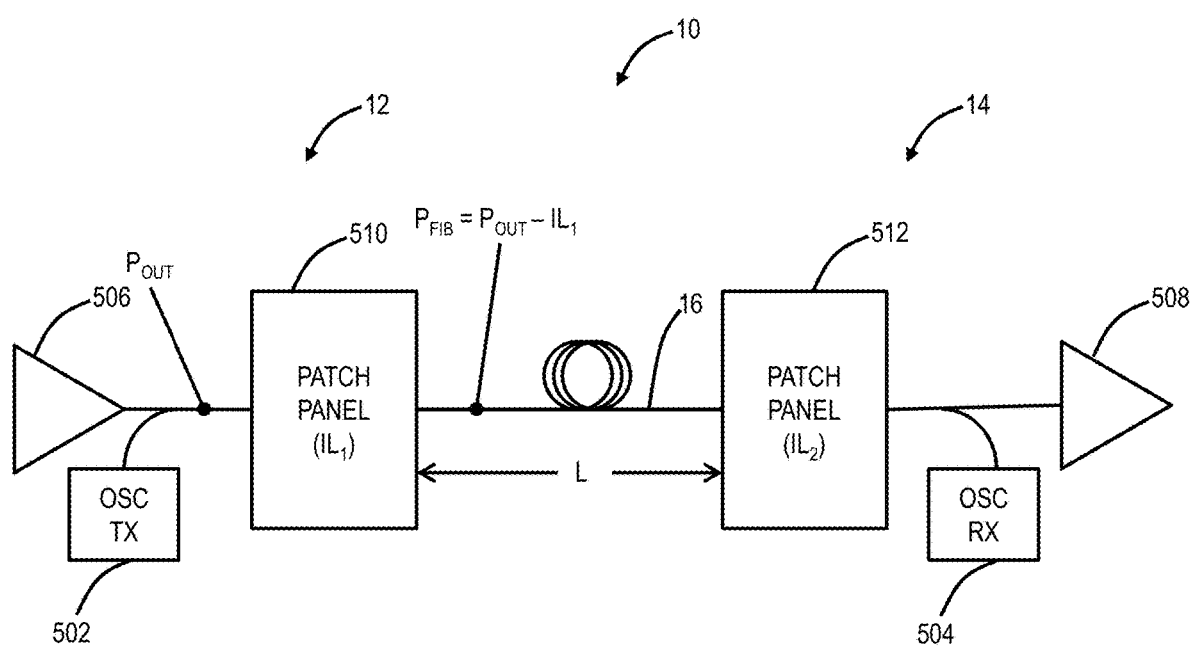
FIG. 10 is a network diagram of the optical network for illustrating a fiber SRS measurement.

FIG. 10 is a network diagram of the optical network 10 for illustrating a fiber SRS measurement. The fiber SRS measurement provides a technique to characterize the nonlinear coefficient of the optical fiber 16, which is correlated to the mode field diameter or effective area ($A_{\mathit{eff}}$), using components generally available in an optical line system. The systems and methods include an SRS measurement capability using existing components, such as an OSC transmitter 502, an OSC receiver 504, and amplifiers 506, 508. For example, in the optical network 10, the node 12 can include a post-amplifier 506 and the node 14 can include a preamplifier 508. The amplifiers 506, 508 can be EDFA-based. The node 12 includes the OSC transmitter 502 and the node 14 include the OSC receiver 504. Further, the node 12 can include a patch panel 510 with Insertion Loss ($IL_1$) and the node 14 can include a patch path 512 with Insertion Loss ($IL_2$). The post-amplifier 506 has an output power, $P_{OUT}$, and the power into the fiber, $P_{FIB}=P_{OUT}-IL_1$.

To estimate the nonlinear coefficient, an SRS measurement is performed using the OSC transmitter 502 (or alternatively OTDR or any other available source outside the optical bandwidth of the amplifier) wavelength as a probe and Amplified Spontaneous Emission (ASE) from the amplifier 506 as the pump.

To perform an SRS measurement, first, the OSC power (denoted as power $P_1$) is measured at the node 14 with the amplifier 506 disabled. For example, the OSC wavelength can be at 1511 nm. Also, this could be the OTDR wavelength. Second, the amplifier 506 is provisioned to produce C-based Amplified Stimulated Emission (ASE) noise. Third, the OSC power is again measured (denoted as power $P_2$). The power $P_2$ is now lower because of energy transfer from the lower wavelength probe (OSC or OTDR wavelength) to the C-Band ASE due to SRS, S(dB) which equals $P_1-P_2$.

S can be scaled to account for fiber length:

$$S' = \frac{S}{1 - e^{-\alpha L}}$$

Here $\alpha$ is the attenuation coefficient of the fiber, which is typically 0.2 dB/km, or can be obtained more accurately from an OTDR trace (attenuation is the slope of the OTDR trace); L is the length of the fiber, which can be obtained from the fiber span measurement. Note, for a long fiber span (e.g., 100 km) $S \approx S'$.

Figure 11:
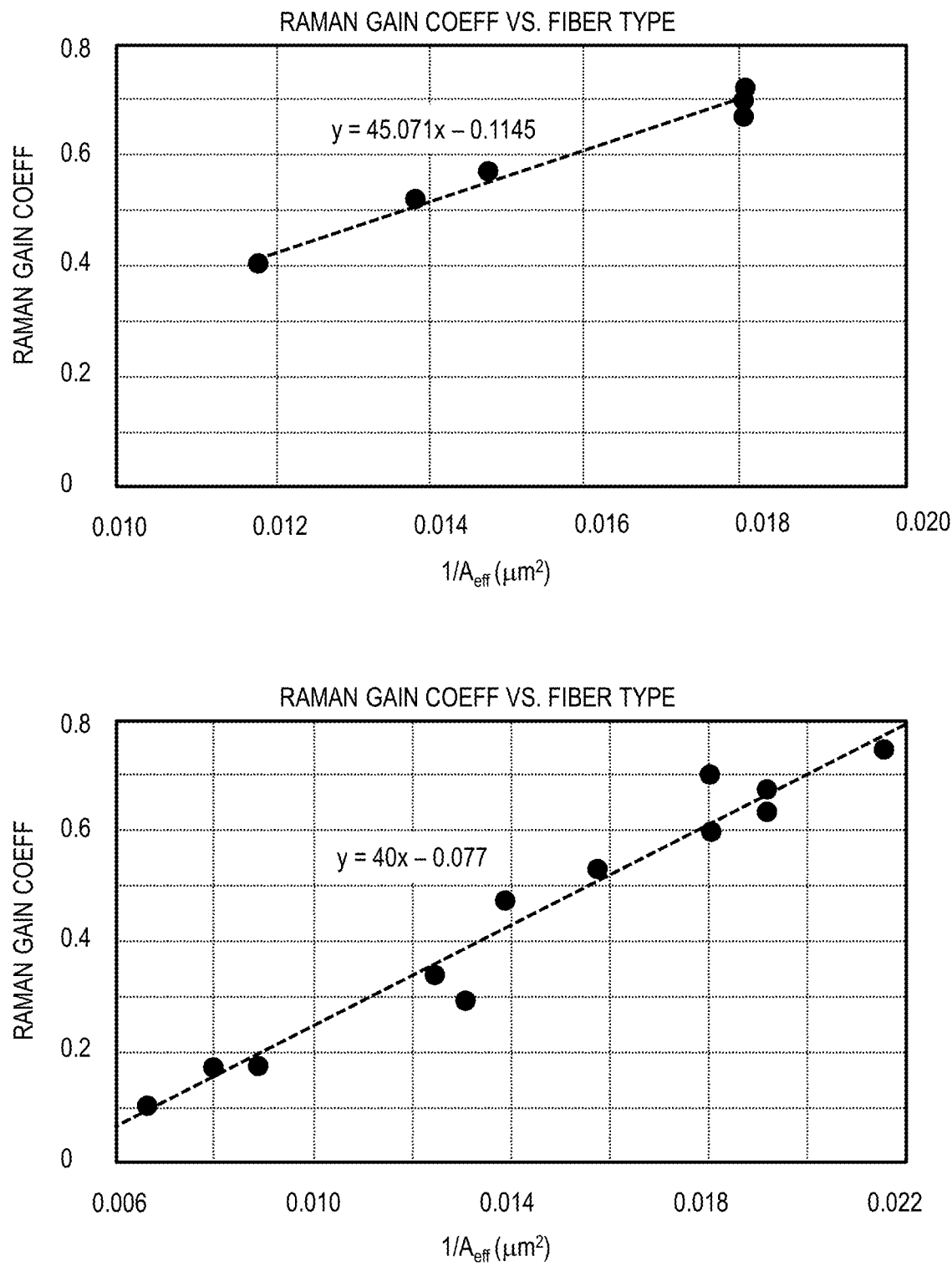
FIG. 11 are graphs of Raman gain coefficient and effective area for different fiber types.
Figure 12:
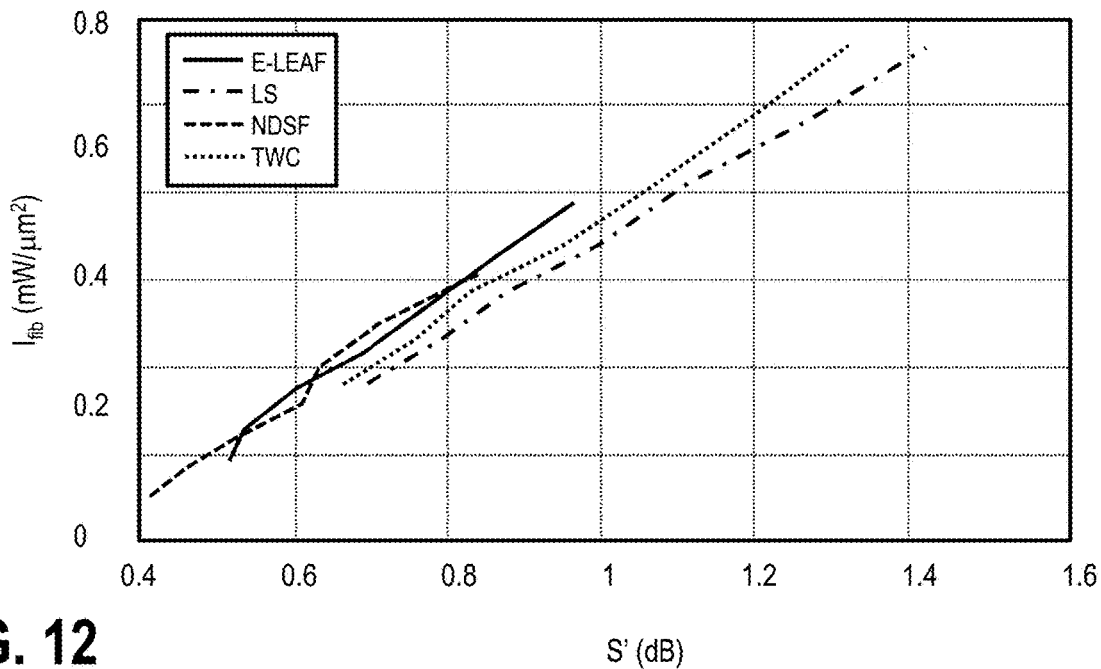
FIG. 12 is a graph of the correlation between the intensity of a C-Band Amplified Stimulated Emission (ASE) source launched into the fiber and the measured SRS coefficient at 1511 nm for patch panel losses between 0 dB and 3 dB.

The SRS parameter S' is directly correlated to the intensity of the pump signal launched into the span fiber, $I_{fib}=P_{fib}/A_{eff}$. This is because the Raman gain coefficient of fiber is mostly a function of $A_{eff}$ as is illustrated in FIG. 11 which are graphs of Raman gain coefficient and effective area for different fiber types. For example, with 85 mW of ASE coupled to a length of Non-Dispersion Shifted Fiber (NDSF), $I_{fib} \approx 1$ mW/um$^2$ and S'$\approx$0.86 dB, which is easily measurable. In Truewave Classic, which has a smaller effective area, S' would be approximately 1.3 dB. If the patch panel loss $IL_1$ is introduced after the upstream amplifier, the S' parameter is reduced accordingly. For example, with $IL_1$=3 dB, S' is reduced to 0.43 dB for NDSF. FIG. 12 illustrates this relationship for different fiber types and patch panel losses varying between 0 and 3 dB. FIG. 12 is a graph of the correlation between the intensity of a C-Band ASE source launched into the fiber and the measured SRS coefficient at 1511 nm for patch panel losses between 0 dB and 3 dB. Note that this relationship is quasi-universal for the different fiber types.

The SRS measurement can be used to calibrate the actual signal intensity launched into the fiber without a priori knowledge of the fiber type or patch panel losses. Also, since power transfer due to SRS and nonlinear penalty both occur primarily in the first 10-20 km of fiber, this approach can be used to optimize launch power even in the case of mixed types of fibers are spliced together.

This measurement can be performed on a per-span basis, which, when used in combination with the dispersion measurement described herein, provides the system (controller) software with the information that it needs to predict and optimize end-to-end channel performance. This allows the system software to extract as much performance as possible out of the line system, for example, by optimizing the launch power of channels going into each span ($P_{fib}$) based on real fiber measurement data rather than generic fiber type information manually entered in a design tool.

Because the measurements are performed from the transmit end of the span, the ASE and probe signals experience the same insertion losses and nonlinearity as any data channels, and therefore can be used to calibrate the optimal channel power. The measurements can be performed automatically in each span and provide sufficient accuracy to allow system software to optimize channel performance. This allows more capacity to be extracted out of the system.

Figure 13:
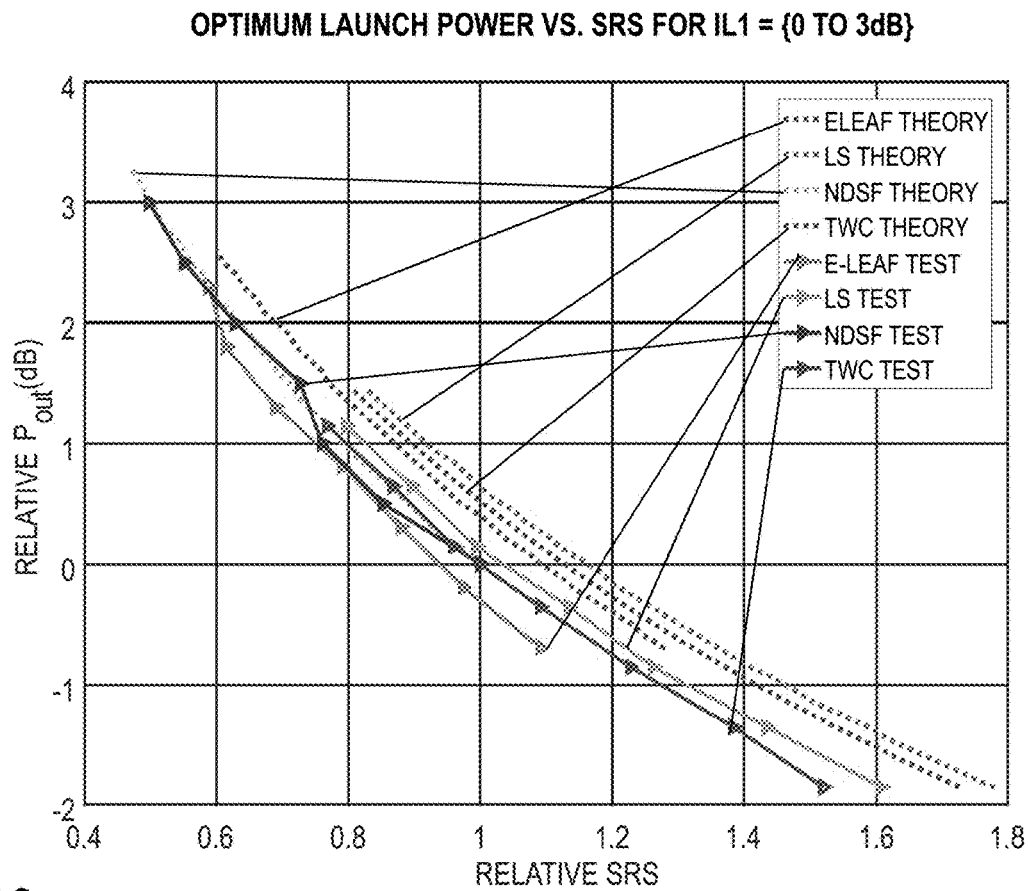
FIG. 13 is a graph of optimum launch power versus SRS.

FIG. 13 is a graph of optimum launch power versus SRS. For example, the optimum launch power given by:

$$P_{out} = P_{ref} + 10\log\left(\frac{S_{ref}}{S'}\right)$$

Assumptions/definitions include the optimum launch power is proportional to $A_{eff}$, the SRS coefficient is inversely proportional to $A_{eff}$, $IL_1$ affects $P_{out}$ and SRS coefficient dB for dB, the $P_{ref}$ is the optimum launch power for NDSF with no patch panel loss, and $S_{ref}$ is the OSC power change due to SRS for 100 km NDSF with no patch panel loss.

The fiber SRS measurement can be executed during an initial span turn-up, similar to a Raman gain calibration procedure. The advantages of this approach are it works for all fiber types including mixed fiber types, takes patch panel losses into account, and requires no additional hardware.

Fiber Dispersion Measurement

Figure 14:
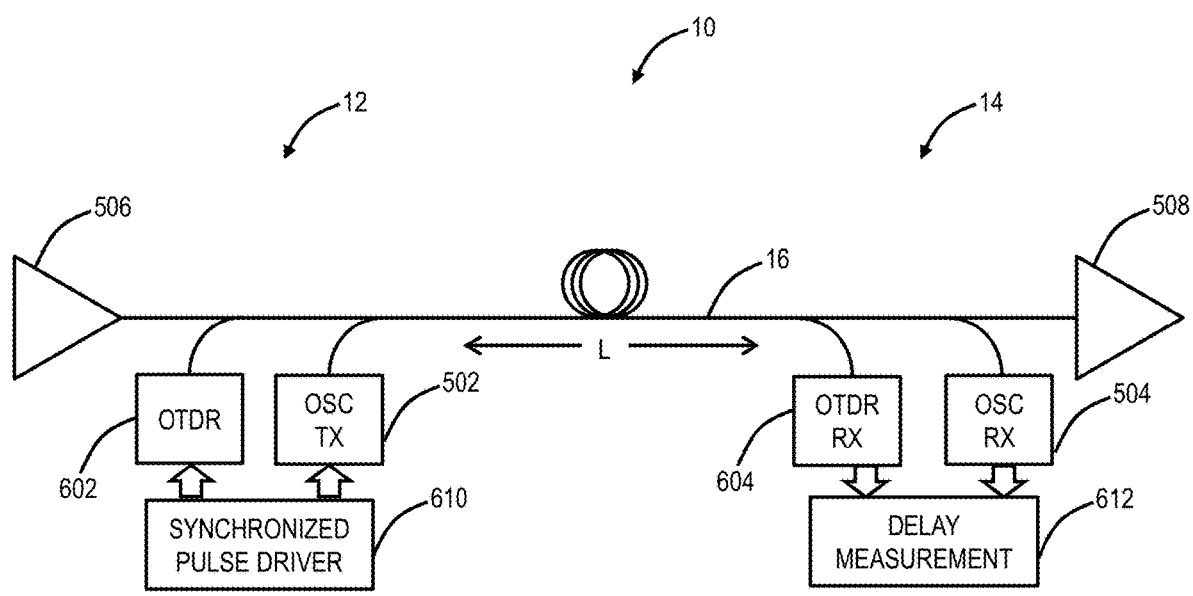
FIG. 14 is a network diagram of the optical network for illustrating a fiber dispersion measurement and nonlinear coefficient.

FIG. 14 is a network diagram of the optical network 10 for illustrating a fiber dispersion measurement and nonlinear coefficient. Similar to the fiber span length measurement and the fiber SRS measurement, the fiber dispersion measurement can be performed with existing equipment integrated in an optical line system and these measurements can be performed on a per-span basis to provide the system (controller) software with the information that it needs to predict and optimize end-to-end channel performance. This allows the system software to extract as much performance as possible out of the line system, for example, by optimizing the launch power of channels going into each span ($P_{fib}$) based on real fiber measurement data rather than generic fiber type information manually entered in a design tool.

The dispersion measurement capability uses existing components such an OTDR including an OTDR source 602 at the node 12 and an OTDR receiver 604 at the node 14 and an OSC including the OSC transmitter 502 and the OSC receiver 504. The measurements can be performed automatically in each span and provide sufficient accuracy to allow system software to optimize channel performance. This reduces operational expenses for operators and allows more capacity to be extracted out of the system.

The dispersion measurement is to measure the differential time delay between optical pulses at two different wavelengths then this number is divided by the fiber length and wavelength separation to obtain an estimate of fiber dispersion at a wavelength corresponding to the average of the two wavelengths. Fiber length can be obtained using the fiber span measurement described herein or by other means such as using Round Trip Delay measurement of the Optical Service Channel (OSC).

Again, this dispersion measurement can leverage existing hardware used for the OSC and OTDR functions. Typical OSC and OTDR wavelengths could be 1511 nm and 1625 nm, respectively, which can be used to provide a dispersion estimate at 1568 nm (the average of the two wavelengths). Those skilled in the art will recognize the OSC and OTDR wavelengths could be different values based on design choice and the only change would the wavelength at which the dispersion estimate is provided, i.e., the average of the two wavelengths.

The OSC and OTDR functions can be located within the same circuit pack or hardware, which makes it possible to synchronize the Tx signals via a synchronized pulse driver 610 and measure the differential delay between the Rx signals at the other end of the span via a delay measurement 612. By using a common clock to drive both the OTDR and OSC transmitters 502, 602, pulses at the two wavelengths can be synchronized to within a nanosecond or a few nanoseconds at the transmit end. Some calibration may be required to compensate for differential delays that can occur in drive electronics or fibers in the optical assemblies. Preferably, a detection circuit can be included within the OSC/OTDR transmitter 502, 602 design to measure the differential delay between the Tx pulses. A feedback loop can then be implemented to minimize the delay. Alternatively, the measured Tx delay value can be sent to the far end via the OSC communication channel or the like. The software/controller calculating the delay at the far end can then subtract this Tx delay value to obtain the true fiber delay.

The synchronized pulse driver 610 can be controlled by a programmable device, such as a Field Programmable Gate Array (FPGA), so that specific pulse patterns can be generated to facilitate the measurement, depending on what type of delay measurement technique is used. For instance, periodic pulses could be created with a particular duty cycle, chosen so that successive pulses at the two wavelengths do not overlap as they propagate down the fiber. Alternatively, encoded bit sequences such as a pseudorandom binary sequence (PRBS) could be generated.

The detection circuit can use known techniques such as lock-in detection. For short time delay measurement, either a time domain cross-correlation technique or frequency domain phase shift measurement technique can be used to measure the differential delay between the two received signals. Cross-correlation works well with PRBS sequence, while phase shift measurement works well with fix frequency tone.

In an embodiment, the fiber dispersion measurement can include the synchronized pulse driver 610 driving a 1511 nm OSC signal and co-propagating 1568 nm OTDR signal with common framing (note, the OTDR rate is not as high as the OSC, but they can include a common frame pulse, such as an OC-3 frame pulse at 8 kHz). The OTDR receiver 604 can terminate the forward propagating OTDR pulses using a dedicated OC-3 receiver (e.g., an Avalanche Photodiode (APD) Receiver Optical Subassembly (ROSA) and WDM filter). A phase detection circuit (PLL) can be used to compare delay of the OSC and OTDR pulses (e.g., ~1 ns/km for NDSF). To obtain the average dispersion at 1538 nm, the fiber length is used which was estimated using OSC round-trip delay measurement or via the fiber span length measurement.

With respect to measuring the differential delays between the OSC and the OTDR signals, each of these signals is driven with the same bit sequence from the synchronized pulse driver 610. Due to dispersion, a narrow pulse on one can be a wider pulse on the other. The differential delay can be measured based on correlations between the two sequences.

Fiber Measurement Process

Figure 15:
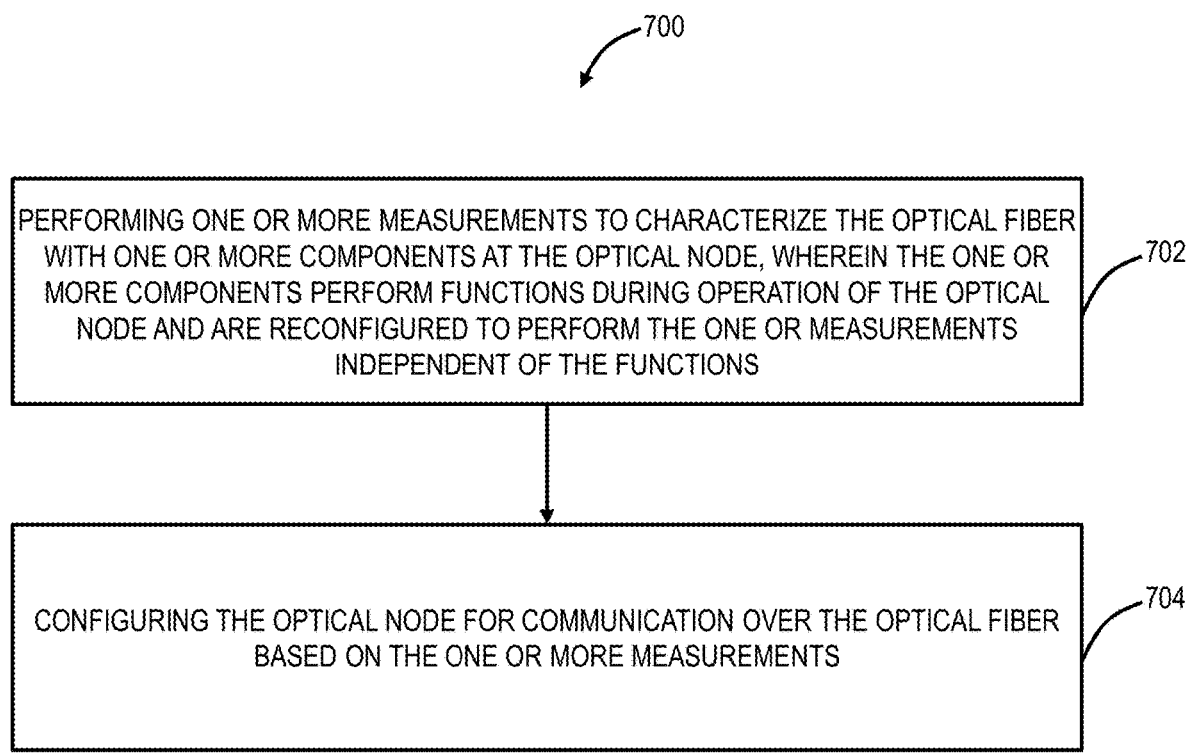
FIG. 15 is a flowchart of a process for characterizing an optical fiber performed in part by an optical node in an optical line system.

FIG. 15 is a flowchart of a process 700 for characterizing an optical fiber performed in part by an optical node in an optical line system. The process 700 includes performing one or more measurements to characterize the optical fiber with one or more components at the optical node, wherein the one or more components perform functions during operation of the optical node and are reconfigured to perform the one or measurements independent of the functions (step 702); and configuring the optical node for communication over the optical fiber based on the one or more measurements (step 704).

The one or more components each can include any of an Optical Service Channel (OSC), an Optical Time Domain Reflectometer (OTDR), and an optical amplifier. Those skilled in the art recognize an OSC is for in-band communications between two adjacent nodes for Operations, Administration, Maintenance, and Provisioning (OAM&P) purposes, the OTDR is for determining back reflections and losses in the optical fiber, and the optical amplifier is for amplification. The measurements are performed by these components separate from their normal functions. The configuring can include setting a launch power into the optical fiber based on the one or more measurements.

In an embodiment, the one or more components can include an Optical Time Domain Reflectometer (OTDR), and the performing one or more measurements can include performing an OTDR measurement with a configurable reflection element configured to provide a clear reference point at the end of the optical fiber; and determining a length of the optical fiber from the OTDR measurement based on the clear reference point. The configurable reflection element can include a 1×N Microelectromechanical systems (MEMS) switch configured to share the OTDR component with a plurality of optical fibers.

In another embodiment, the one or more components can include i) an optical wavelength formed through one of an Optical Service Channel (OSC) and an Optical Time Domain Reflectometer (OTDR), and ii) an optical amplifier, and the performing one or more measurements can include measuring power $P_1$ of the optical wavelength at a downstream node from the optical node with the optical amplifier disabled; measuring power $P_2$ of the optical wavelength at a downstream node from the optical node with the optical amplifier configured to generate Amplified Stimulated Emission (ASE); and determining Stimulated Raman Scattering (SRS) based on the measured power $P_1$ and power $P_2$. The performing one or more measurements can further include scaling the SRS based on fiber length and using an attenuation coefficient of the optical fiber. The configuring the optical node can include determining launch power into the optical fiber based on the scaled SRS.

In a further embodiment, the one or more components can include an Optical Service Channel (OSC) at a first wavelength and an Optical Time Domain Reflectometer (OTDR) at a second wavelength, and the performing one or more measurements can include driving each of the first wavelength and the second wavelength with the same bit pattern in a synchronized manner; and measuring dispersion over the optical fiber based on receiving the first wavelength and the second wavelength at a downstream node. The measuring dispersion can include determining a differential time delay between optical pulses on each of the first wavelength and the second wavelength and dividing the differential time delay by a length of the optical fiber and separation of the first wavelength and the second wavelength to determine the dispersion at an average of the first wavelength and the second wavelength.

An optical node in an optical line system configured to characterize an optical fiber includes one or more components configured to perform functions during operation of the optical node, wherein the one or more components are configured to perform one or more measurements to characterize the optical fiber, wherein the one or more components perform functions during operation of the optical node and are reconfigured to perform the one or measurements independent of the functions; and an optical modem which is configured for communication over the optical fiber based on the one or more measurements.

An apparatus configured to characterize an optical fiber performed in part by an optical node in an optical line system includes circuitry configured to cause one or more measurements to characterize the optical fiber with one or more components at the optical node, wherein the one or more components perform functions during operation of the optical node and are reconfigured to perform the one or measurements independent of the functions; and circuitry configured to configure optical node for communication over the optical fiber based on the one or more measurements.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An optical node in an optical line system configured to characterize an optical fiber, the optical node comprising:
at least two lasers each configured to provide a different wavelength from one another to the optical fiber to a second optical node;
an optical amplifier connected to the optical fiber;
wherein each of the least two lasers and the optical amplifier are integrated components for performance of functionality in the optical line system, and wherein each is configurable to perform a measurement function on the optical fiber independent of the functionality in the optical line system, and
wherein the measurement function includes one or more of a fiber length measurement, a fiber dispersion measurement, and a Stimulated Raman Scattering (SRS) measurement; and
one or more optical modems that are configured for communication over the optical fiber based on the measurement function.

2. The optical node of claim 1, wherein a launch power of the one or more optical modems into the optical fiber is set based on results from the measurement function.

3. The optical node of claim 1, further comprising
one or more receivers each configured to receive a corresponding different wavelength from the second optical node via a second optical fiber, wherein the one or more receivers are integrated components for performance of functionality in the optical line system, and wherein the one or more receivers are configurable to perform the measurement function on the second optical fiber independent of the functionality in the optical line system.

4. The optical node of claim 1, wherein the measurement function is the fiber length measurement, wherein a laser of the at least two lasers is configured for an Optical Time Domain Reflectometer (OTDR), and wherein the fiber length measurement is based on an OTDR measurement with a clear reference point at the second optical node.

5. The optical node of claim 4, wherein the clear reference point is provided for a configurable referent element at the second optical node that is configured to cause the clear reference point on an OTDR trace.

6. The optical node of claim 1, wherein the measurement function is the fiber dispersion measurement, and wherein the fiber dispersion measurement is performed by the at least two lasers each configured to provide the different wavelength with a same bit pattern in a synchronized manner or with known delays.

7. The optical node of claim 6, wherein the fiber dispersion measurement is measured by a determining a differential time delay between optical pulses on each of the different wavelengths and dividing the differential time delay by a length of the optical fiber and separation of the different wavelengths to determine the dispersion at an average of the different wavelengths.

8. The optical node of claim 1, wherein the measurement function is the SRS measurement that is based on two measurements including one with the optical amplifier disabled and one with the optical amplifier configured to generate Amplified Stimulated Emission (ASE).

9. The optical node of claim 8, wherein the SRS measurement is utilized to determine launch powers of optical signals independent of knowledge of a fiber type and patch panel losses.

10. A method comprising:
configuring an optical node in an optical line system to perform a measurement function, wherein the optical node includes at least two lasers each configured to provide a different wavelength from one another to the optical fiber to a second optical node and an optical amplifier connected to the optical fiber;

performing the measurement function that includes one or more of a fiber length measurement, a fiber dispersion measurement, and a Stimulated Raman Scattering (SRS) measurement; and configuring the optical node to perform functionality in the optical line system that is independent of the measurement function including configuration one or more optical modems for communication over the optical fiber based on the measurement function.

11. The method of claim 10, wherein a launch power of the one or more modems into the optical fiber is set based on results from the measurement function.

12. The method of claim 10, further comprising configuring one or more to receive a corresponding different wavelength from the second optical node via a second optical fiber, wherein the one or more receivers are integrated components for performance of functionality in the optical line system, and wherein the one or more receivers are configurable to perform the measurement function on the second optical fiber independent of the functionality in the optical line system.

13. The method of claim 10, wherein the measurement function is the fiber length measurement, wherein a laser of the at least two lasers is configured for an Optical Time Domain Reflectometer (OTDR), and wherein the fiber length measurement is based on an OTDR measurement with a clear reference point at the second optical node.

14. The method of claim 13, wherein the clear reference point is provided for a configurable referent element at the second optical node that is configured to cause the clear reference point on an OTDR trace.

15. The method of claim 10, wherein the measurement function is the fiber dispersion measurement, and wherein the fiber dispersion measurement is performed by the at least two lasers each configured to provide the different wavelength with a same bit pattern in a synchronized manner or with known delays.

16. The method of claim 15, wherein the fiber dispersion measurement is measured by a determining a differential time delay between optical pulses on each of the different wavelengths and dividing the differential time delay by a length of the optical fiber and separation of the different wavelengths to determine the dispersion at an average of the different wavelengths.

17. The method of claim 10, wherein the measurement function is the SRS measurement that is based on two measurements including one with the optical amplifier disabled and one with the optical amplifier configured to generate Amplified Stimulated Emission (ASE).

18. The method of claim 17, further comprising utilizing the SRS measurement to determine launch powers of optical signals independent of knowledge of a fiber type and patch panel losses.

19. An optical node in an optical line system configured to characterize an optical fiber, the optical node comprising:

at least two lasers each configured to provide a different wavelength from one another to the optical fiber to a second optical node;

an optical amplifier connected to the optical fiber;

wherein each of the least two lasers and the optical amplifier are integrated components for performance of functionality in the optical line system, and wherein each is configurable to perform a measurement function on the optical fiber independent of the functionality in the optical line system, wherein the measurement function includes two or more of a fiber length measurement, a fiber dispersion measurement, and a Stimulated Raman Scattering (SRS) measurement, wherein the fiber dispersion measurement is performed by the at least two lasers each configured to provide the different wavelength with a same bit pattern in a synchronized manner or with known delays, and wherein the SRS measurement that is based on two measurements including one with the optical amplifier disabled and one with the optical amplifier configured to generate Amplified Stimulated Emission (ASE).

20. The optical node of claim 19, further comprising one or more optical modems that are configured for communication over the optical fiber based on the measurement function.

* * * * *